(12) United States Patent
Van Hees

(10) Patent No.: US 8,033,327 B2
(45) Date of Patent: Oct. 11, 2011

(54) DEVICE FOR EXTRACTING HEAT FROM GAS AND FOR RECOVERING CONDENSATES

(75) Inventor: Christian Van Hees, Roosendaal (NL)

(73) Assignee: Saint-Gobain Technical Fabrics Europe, Chambery (FR)

( * ) Notice: Subject to any disclaimer, the term of this patent is extended or adjusted under 35 U.S.C. 154(b) by 900 days.

(21) Appl. No.: 11/815,972

(22) PCT Filed: Feb. 3, 2006

(86) PCT No.: PCT/FR2006/050093
§ 371 (c)(1),
(2), (4) Date: Feb. 14, 2008

(87) PCT Pub. No.: WO2006/085019
PCT Pub. Date: Aug. 17, 2006

(65) Prior Publication Data
US 2008/0264615 A1    Oct. 30, 2008

(30) Foreign Application Priority Data
Feb. 10, 2005   (FR) .................................... 05 50397

(51) Int. Cl.
*F28F 1/00* (2006.01)
(52) U.S. Cl. ............................ 165/172; 65/335; 165/95

(58) Field of Classification Search .................... 65/335; 165/95, 119, 1, 92, 172
See application file for complete search history.

(56) References Cited

U.S. PATENT DOCUMENTS

| | | | | |
|---|---|---|---|---|
| 2,721,626 A * | 10/1955 | Rick | ................. | 95/273 |
| 3,385,581 A * | 5/1968 | Cerles | ......................... | 198/658 |
| 4,344,479 A * | 8/1982 | Bailey | ........................ | 165/109.1 |
| 4,366,855 A * | 1/1983 | Spitz | ............................ | 165/95 |
| 5,488,836 A * | 2/1996 | Laude-Bousquet | ............. | 62/532 |
| 5,753,157 A * | 5/1998 | Hall et al. | ........................ | 264/53 |
| 2002/0050342 A1 * | 5/2002 | Gerstmann et al. | ........ | 165/109.1 |
| 2003/0116306 A1 | 6/2003 | Besik | | |

FOREIGN PATENT DOCUMENTS

| | | |
|---|---|---|
| DE | 1 006 106 | 4/1957 |
| JP | 57 187596 | 11/1982 |

* cited by examiner

*Primary Examiner* — Matthew Daniels
*Assistant Examiner* — Yana Belyaev
(74) *Attorney, Agent, or Firm* — Oblon, Spivak, McClelland, Maier & Neustadt, L.L.P.

(57) ABSTRACT

A device for extracting heat from gas, particularly combustion gas, containing dust and/or condensable substances, for recovering condensates, and including at least one heat exchanger including a shell having a symmetry of revolution surrounded by a cooling jacket. The device includes an opening for passage of a surfactant for treating the internal surface of the shell, the shell including at least one mechanism creating a substantially helicoid rotating gas stream in at least part of the shell.

24 Claims, 2 Drawing Sheets

DEVICE FOR EXTRACTING HEAT FROM GAS AND FOR RECOVERING CONDENSATES

CROSS-REFERENCE TO RELATED APPLICATIONS

The present application is the U.S. counterpart of WO 2006/085019, and claims priority to French application no. 05/50397 filed on Feb. 10, 2005, the entire contents of each of which are incorporated herein by reference.

BACKGROUND OF THE INVENTION

I. Field of the Invention

The present invention relates to the field of the treatment of hot gases, particularly combustion gases, in order to recover, on the one hand, the heat conveyed by these gases and, on the other, the condensable materials present therein. It relates more particularly to the treatment of gas containing dust and/or condensable substances, which may in particular be produced in a furnace, such as a furnace for melting glass or similar mineral material.

II. Description of Related Art

In a glass furnace, the glass batch material is heated to the molten state at a temperature of about 1200 to 1300° C. using heat energy provided in particular by gas burners. The combustion gases escape from the furnace at a temperature of about 1000 to 1200° C., entraining a certain quantity of gaseous materials deriving from volatile components of the glass batch, such as boron.

The furnace gas exit zone is generally equipped with a cooling tower for recovering part of the heat of the combustion gases, for reuse to heat the primary combustion air, and also to condense the volatile materials in order to separate them and discharge the cooled gas to the atmosphere.

The cooling tower generally comprises a first stage in which the cold fluid is atmospheric air, which issues from the heat exchanger at a temperature of about 600° C. and can be recycled to the burners as oxidizing air, a stage in which the combustion gases treated issue at a temperature of about 700° C., and a second stage in which the cold fluid is water sprayed directly into the treated combustion gases, causing the solidification into dust of the condensable substances. The mixture of cooled gas, steam and dust is then separated by an electrostatic filter which traps the dust and discharges a gas at a temperature of about 400° C.

This discharge to the atmosphere represents a substantial loss of energy that may amount to several megawatt.hours of operation of an industrial glass production installation.

However, the presence of condensable materials, which represents several grams of material per cubic meter of hot gas, precludes the treatment of this gas in a conventional heat exchanger, because it would be very rapidly clogged by the condensed dust. It would only be capable of operating in short cycles interrupted by cleaning cycles which raise real intrinsic technical difficulties and which are also liable to disturb the production of glass.

In fact, the discharge to the atmosphere of condensable material is due to be prohibited shortly by environmental legislation. It is therefore becoming necessary for the flue gases to be stripped of condensable material before discharge.

BRIEF SUMMARY OF THE INVENTION

It is the object of the invention to solve this problem of smoke pollution control and to provide a device capable of extracting the heat from these hot gases durably throughout the production of said gases without disturbing production.

In this respect, the subject of the invention is a device for extracting heat from gas, particularly combustion gas, containing dust and/or condensable substances, for recovering the condensates, and comprising at least one heat exchanger comprising a shell having a symmetry of revolution surrounded by a cooling jacket, characterized in that it comprises an opening for the passage of an optimal mixture of surfactant for treating the internal surface of said shell, said shell being further provided with at least one helicoid screw arranged coaxially in a tube.

Thanks to this rotary flow of the gas stream, the dust and/or substances are projected against the cold walls of the treatment chamber and condense on these cold walls to which they adhere, and the accumulation of solids is destroyed by abrasion following the passage of the surfactant through the chamber.

The fluid flowing in the cooling jacket may be of any commonly employed type, particularly oil or water.

According to other advantageous features, the device has a shape that is substantially cylindrical, conical, frustoconical or resulting from the combination of at least one cylinder and at least one cone or truncated cone.

The device is preferably arranged horizontally.

The dimensions of the device and the number of chambers incorporated within the device are adapted to the volume of gas to be treated according to the installation producing the gases.

The portion containing the substantially helicoid rotating gas stream is preferably sufficiently long for the stream to make at least two spiral turns, at least 4, particularly at least 5.

The means for creating a rotating gas stream comprise at least one helicoid screw arranged coaxially in a tube.

In an advantageous embodiment, the means for creating a rotating gas stream comprise, on the one hand, means for conveying hot gas tangentially to the treatment device, and on the other, helicoid screws. The helicoid rotary movement is easily obtained along the desired length by selecting the gas inlet speed and the screw pitch, which may, optionally, not be constant along the total length of the screw.

According to an advantageous feature of the invention, the surface treatment of the internal surface of each of the chambers, or more precisely, the cleaning, can also be continuous during the operation of the device, thanks to means for conveying a solid surfactant into the rotating gas stream.

Like the dust, the surfactant is projected against the cold wall of the chamber under the effect of the centrifugal force, and the kinetic energy of the solid surfactant particles is then sufficient to abrade the dust deposit that has adhered to the cold wall.

According to the types of materials of the device and of the deposits, the surfactant may be selected in order to abrade the deposit adhering to the walls of the chamber.

Advantageously, the surfactant is selected from the components of the glass batch composition that is initially used in the furnace, in order to recycle it to this composition.

Hence the device comprises means for conveying and collecting the surfactant, respectively upstream and downstream of the part of the device containing the rotating gas stream for recovering the dust or condensed solids and/or recycling the surfactant. The gases may issue in any known manner, especially tangentially to the axis of the shell for a cylindrical shell in particular, or axially.

According to an advantageous embodiment, the treatment device and its cooling jacket consist of an outer jacket bounding an internal volume limited by bulkheads penetrated by a plurality of tubes and forming heat exchange chambers, each of these chambers receiving a helicoid screw.

On the one hand, this constitutes a double wall withstanding very high internal pressures. On the other, the juxtaposition of the circular-section tubes offers a higher heat exchange area than the area offered by a plane surface.

Among other applications of the device described, one subject of the invention is a furnace, particularly a furnace for melting glass or similar mineral material, comprising an exit zone for hot gas containing dust and/or condensable substances and equipped with a unit for cooling said hot gas, characterized in that the cooling unit comprises at least one device for extracting heat and for condensing the condensable substances as described above.

In this application, part of the dust may be too fine to continue to adhere to the inside wall of the treatment chamber. The furnace may then further comprise means for transferring the gas cooled in the cooling unit to a filter which traps the dust and discharges the filtered gas to the atmosphere.

Thanks to the heat exchange device according to the invention, which is designed for recovering dust and condensable substances entrained with the combustion gases, the yield of a process, particularly a melting process, can be improved by reintroducing the dust and substances collected by the exchanger into the batch material to be treated in the furnace or directly into the furnace.

If the dust and condensable substances are recovered by abrasion using a surfactant, the use of a component of the glass batch material, particularly sand used as a surfactant, is especially advantageous in a glass furnace because it can be recycled with the dust as raw material for the glass batch.

The heat exchange device can be dimensioned in order to extract a sufficient quantity of heat to produce steam. For this purpose, water can be used directly as coolant fluid in the jacket of the device according to the invention. In this case, the shape and construction of the chambers and the jacket are selected so as to withstand the loads applied by the steam pressure in the jacket.

BRIEF DESCRIPTION OF THE DRAWINGS

Other features and advantages of the invention will appear from a reading of the description of the drawings appended hereto, in which.

DETAILED DESCRIPTION OF THE INVENTION

For the sake of clarity, it must be stated that the elements as shown in the figures are not necessarily reproduced to scale, certain dimensions having been increased or reduced, and that some constructive details may have been omitted as inessential to an understanding of the invention.

Figure 1:
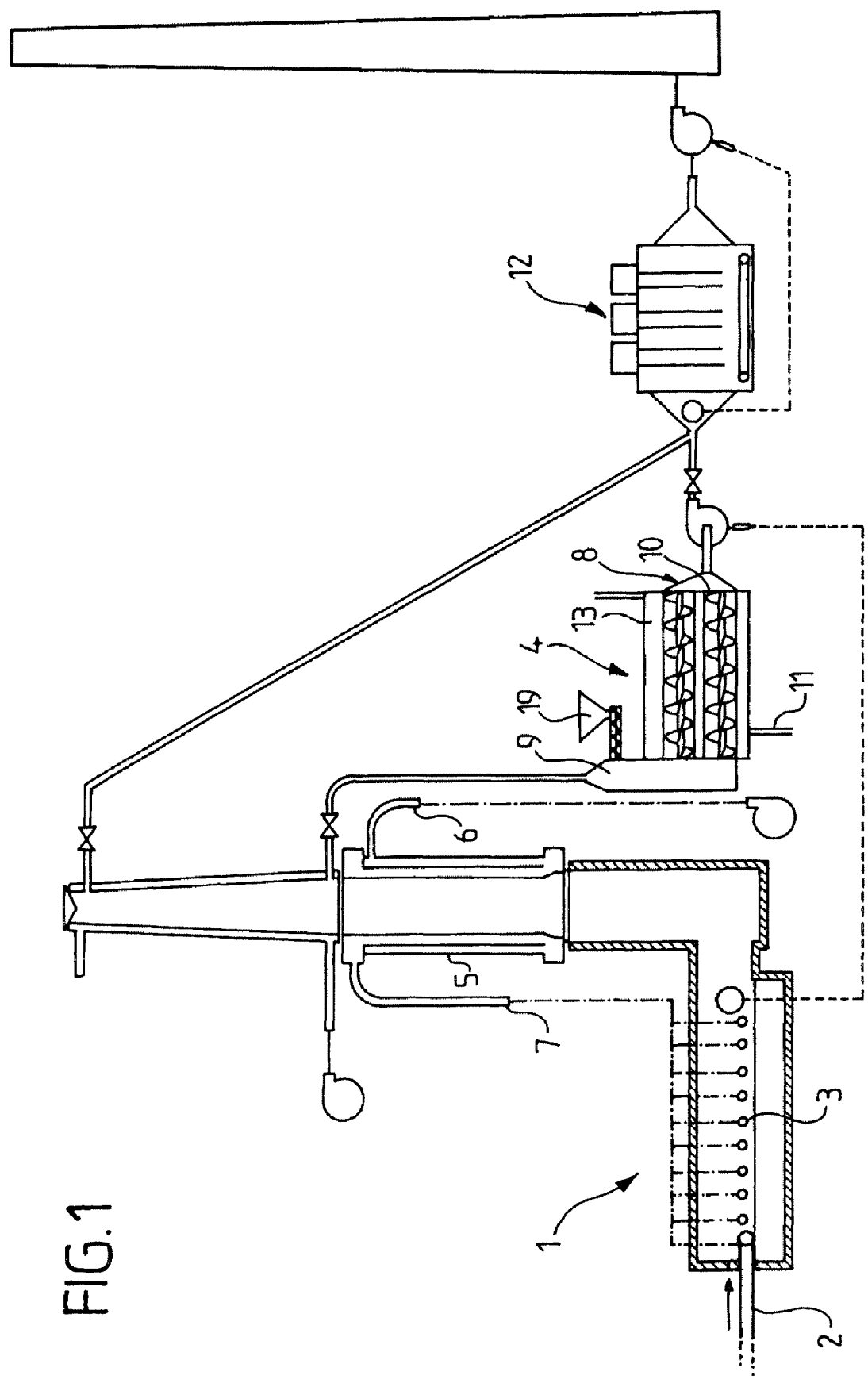
FIG. 1 schematically shows a glass furnace equipped with a device according to the invention.

The installation shown in FIG. 1 essentially comprises a glass furnace 1, supplied with glass batch by common appropriate means 2, and in which the energy of fusion is provided by gas burners 3.

The glass produced in the furnace is tapped off by means, not shown, to be shaped into products that may be of a wide variety, particularly products based on glass wool or fibers, such as padding, netting and other products, or various organic or inorganic materials can be added to the glass. At one end of the furnace, the combustion gases, which are laden in particular with gaseous compounds derived from volatile elements in the glass batch, are sent to a cooling unit 4 where they are cooled from a temperature of about 1000° C. to a temperature of about 200° C.

This unit comprises a first heat exchanger 5 using atmospheric air 6 as cold fluid.

This heat exchanger is dimensioned so that the heat extracted by the air 6 raises the temperature thereof to about 600° C., so that it can be advantageously used as hot oxidizer reintroduced 7 in the burners 3.

The temperature of the combustion gases leaving the first heat exchanger is about 700° C. At this temperature, the condensable substances derived from volatile elements of the glass batch are still in the gas state, and the heat exchanger 5 has not been exposed to any solid material.

The unit 4 comprises a second heat exchanger 8 in series with the first heat exchanger 5, for extracting an additional fraction of heat from the gases cooled to 700° C. by lowering the temperature of the gases below the solidification point of the condensable volatile materials.

The heat exchanger 8 (shown in detail in FIG. 2) consists of a device according to the invention, essentially having the shape of an elongated cylindrical body in which heat exchange means are arranged. It comprises a gas inlet 9 tangential to the axis of the tubular body, and an axial gas outlet 10 arranged on the side opposite the feed side.

It is dimensioned so that the treated gases leaving the device are cooled to a temperature of about 200° C.

The gases are further at least partly rid of dust, the dust being collected in a collector 11. The gases leaving the device can then be treated before discharge to the atmosphere, using a filter 12 that may be of any known type, advantageously a simple cloth filter, or an electrostatic filter like those generally employed to treat the hot gas leaving a water spray cooling tower.

Figure 2:
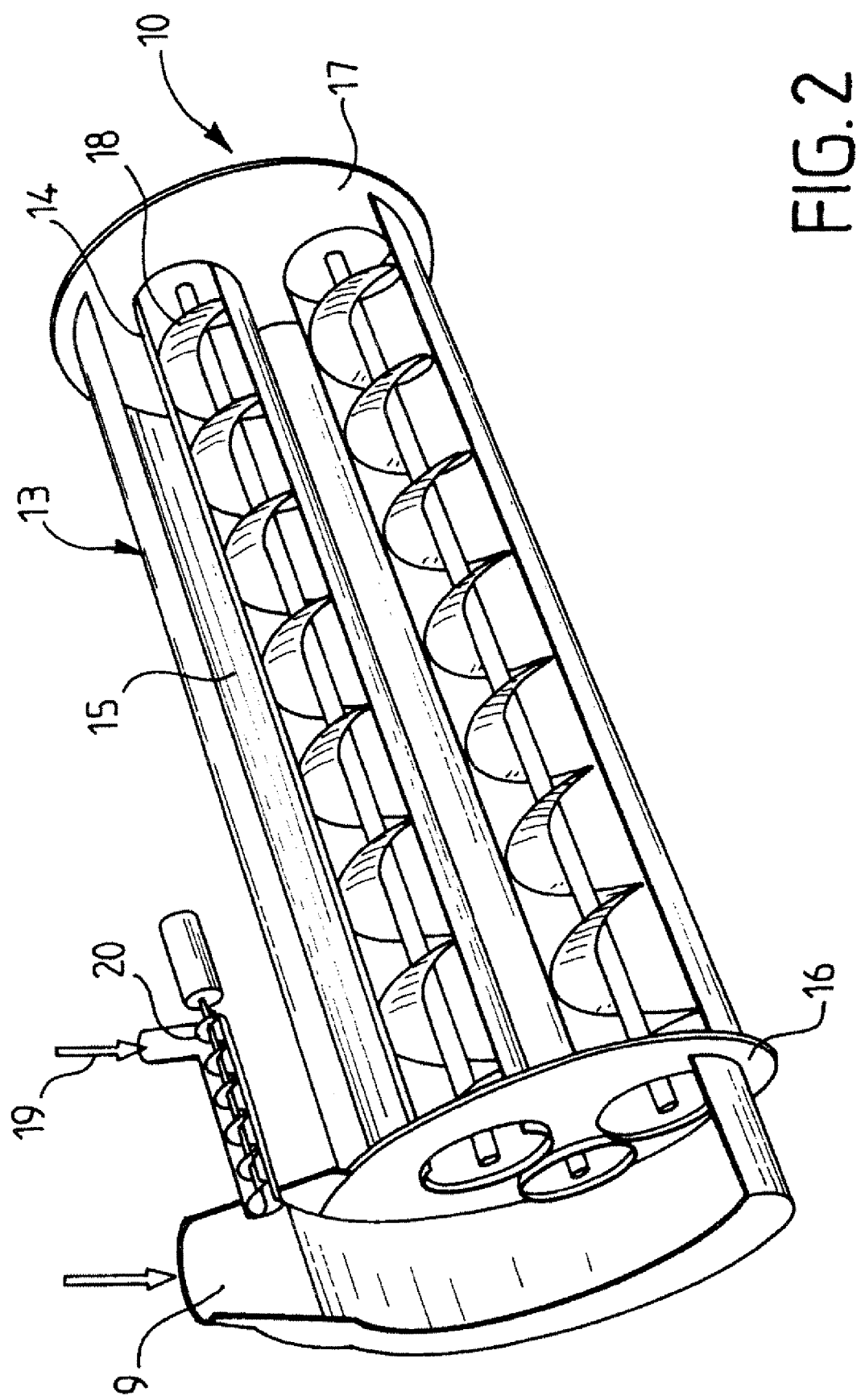
FIG. 2 shows a perspective view of this device.

The internal structure of the device is shown in a perspective view in FIG. 2.

The cylindrical part of the chamber 13 of the device consists of a shell formed of an outer tube and a plurality of internal tubes 14 which bounds the treatment chamber, tubes 14 between which a stream of cooling fluid 15 flows, such as water introduced via a line and discharged.

The tubes are held in position inside the shell using a plurality of flanges 16, 17 (two can be seen in FIG. 2), these flanges 16, 17 being substantially positioned radially to the main axis of the chamber.

Each of the tubes 14 incorporates a device for increasing the turbulence of the gas flow in the tube to obtain a better heat transfer coefficient at the heat exchange surface with the cooling fluid.

The figure shows a helicoid screw 18, optionally with a variable screw pitch along its entire length.

Moreover, due to the high temperature gradients present between the upstream and downstream parts of the screw 18, the screw 18 is made in its upstream part from stainless steel (high gradient), and in its downstream part from carbon steel, the upstream/downstream direction being defined by the flow direction of the gases issuing from the first heat exchanger 5.

The gases to be treated are conveyed via a line that communicates with the tangential inlet 9 arranged on one side of the cylindrical part, close to the flange 16. The gases introduced tangentially at the periphery of each tube initiate a rotary movement inside each tube.

As a variant not shown in the figures, each tube and its screw are supplied by their own inlet line of gas to be treated, each tube also having its own device for injecting a surfactant, suitable for removing the dust condensed on the cold walls of each of the tubes.

This rotary movement is imposed by the location of the tangential inlet at the periphery of each tube and by the presence of propellers or screws 18 inside the tubes 14, this configuration ensuring the establishment of a rotating gas stream in substantially the whole cylindrical part.

This geometry ensures an optimal distribution or mixing of the surfactant inside each tube.

The device can operate under pressure or vacuum, by installing a blower respectively upstream of the device, for example on the line, to push the gases through the device, or downstream of the outlet to suck out the treated gases toward the exterior. The speed of the gases in the device is advantageously high, particularly about 10 to 40 m/s at the hot gas inlet, corresponding to about 10 to 30 m/s at the cooled gas outlet.

In operation, the gases laden with condensable substances, such as boron (which condenses at a temperature below 600° C., preferably between 600 and 200° C.), follow the route imposed on the gases inside the tubes 14 and flow along the wall cooled by the cooling water. In doing so, the gas temperature decreases, the condensable substances solidify into dust that adheres to the cold wall upon contact with it, particularly under the effect of the centrifugal force, and forms a deposit on at least part of the length of the tubes.

This deposit can raise a problem insofar as, by thickening, it thermally insulates the wall and lowers the heat transfer efficiency, and ultimately, may hinder the passage of the gases.

However, the shape of the device permits a very simple cleaning of the wall, using the following means.

The device comprises a surfactant reserve 19 (visible in FIG. 1), especially of an abrasive particulate material such as sand, capable of delivering the material into the stream of gas to be treated, via a branch in the line or directly into the chamber. The abrasive material feed can be controlled by a valve or by any similar feeding means 20.

In order to remove the deposit formed on the wall, it suffices to deliver a flow of abrasive material, which may be very low, with the gases to be treated.

The particles of material are entrained in the rotating gas stream and projected by centrifugal force against the walls so that they detach the deposit and clean the surface of the inside wall of the tubes.

The abrasive material and the deposit detached from the surface are entrained by the gas stream downstream of the device and are collected by any appropriate device.

If the abrasive material used is sand, the installation may comprise means for conveying separated solids from the collector to the means for feeding the furnace with glass batch, because the sand and the deposit material enter into the composition thereof.

A very short treatment time suffices to rid the surface of the deposit and again reach an optimal heat transfer efficiency, without interrupting the gas flow and hence without disturbing the process upstream of the device. For information, in the previously indicated heat exchange conditions (hot and cold gas temperature, gas speed), the heat exchanger can operate satisfactorily for 8 consecutive hours, after which a 10-minute cleaning cycle, using 3 liters of sand, can clean the surfaces completely.

A filter 12 can be installed on the gas exit line for complete separation of the sand and, optionally, of dust, before the gases reach the filter.

The invention has been described for the case of a device with a cylindrical portion, but must not be limited to this particular embodiment, and all other forms previously described are also feasible.

Similarly, the invention has been described preferably for the case of a glass melting installation, but also applies to the treatment of other industrial flue gases. In particular, the cooling unit of which the device of the invention forms part can be designed differently, with or without another heat exchanger, not limited to the type shown in FIG. 1.

The invention claimed is:

1. A device for extracting heat from gas, or combustion gas, containing dust and/or condensable substances, for recovering condensates, the device comprising:
   at least one heat exchanger including
      at least one gas inlet;
      a cooling jacket surrounding a chamber having a symmetry of revolution about an axis, the cooling jacket being an outer tube,
      an opening provided in the heat exchanger to pass an optimal mixture of surfactant into the at least one heat exchanger, the surfactant being configured to treat internal surfaces of the the at least one heat exchanger,
      a plurality of internal tubes located inside the chamber, the plurality of internal tubes each bounding a treatment chamber, each of the plurality of internal tubes being provided with a coaxially arranged helicoid screw, the helicoid screw being rotatable by a speed of the gas or of the combustion gas, and
      a stream of cooling fluid flowing between the plurality of internal tubes, the cooling fluid being introduced via a line and discharged; and
   a conveyor that conveys the surfactant on an upstream side of the device and a collector that collects the surfactant on a downstream side of the device.

2. The device as claimed in claim 1, wherein the device has a shape that is substantially cylindrical, conical, frustoconical, or resulting from a combination of at least one cylinder and at least one cone or truncated cone.

3. The device as claimed in claim 1, wherein the conveyor conveys the surfactant into a gas stream that is rotated by the helicoid screw of each of the plurality of internal tubes, such that a surface treatment of an internal surface of each of the plurality of internal tubes is continuous during operation of the device.

4. The device as claimed in claim 1, further comprising the surfactant, wherein the surfactant is selected to abrade a deposit adhering to walls of the plurality of internal tubes.

5. The device as claimed in claim 4, wherein the surfactant is selected from components of a glass batch composition that is initially used in a furnace, such that the surfactant collected by the collector is recyclable to the composition.

6. The device as claimed in claim 1, wherein a pitch of the helicoid screw is variable.

7. The device as claimed in claim 6, wherein the helicoid screw includes two parts respectively made from different materials or from stainless steel and carbon steel.

8. A furnace for melting glass or similar mineral material, comprising:
   an exit zone for hot gas containing dust and/or condensable substances and including a cooling unit that cools the gas, the cooling unit having at least one heat extraction device configured to extract heat from the hot gas and to recover condensates, the heat extraction device including
      at least one a heat exchanger including
         at least one gas inlet;
         a cooling jacket surrounding a chamber having a symmetry of revolution about an axis, the cooling jacket being an outer tube, an opening provided in the heat exchanger to pass an optimal mixture of surfactant into the at least one heat exchanger, the surfactant being configured to treat internal surfaces of the at least one heat exchanger, a plurality of internal tubes located inside the chamber, the plurality of internal tubes each bounding a treatment chamber, each of the plurality of internal tubes being provided with a coaxially arranged helicoid screw, the helicoid screw being rotatable by a speed of the gas, and a stream of cooling fluid flowing between the plurality of internal tubes, the cooling fluid being introduced via a line and discharged; and a conveyor that conveys the surfactant on the upstream side of the device and a collector that collects the surfactant on a downstream side of the device.

9. The furnace as claimed in claim 8, further comprising a gas transfer unit that transfers the gas cooled in the cooling unit to a filter, which discharges filtered gas to the atmosphere.

10. The furnace as claimed in claim 8, wherein the cooling unit further comprises a recycling unit that reintroduces solids collected into a batch material by the collector to the furnace for treatment by the furnace or reintroduces solids directly into the furnace.

11. The device as claimed in claim 1, further comprising
a gas inlet provided tangentially to the axis of the chamber on an upstream side of the at least one heat exchanger, the gas inlet configured to introduce the optimal mixture of the surfactant into the at least one heat exchanger, the surfactant being configured to treat an internal surface of each of the plurality of internal tubes of the at least one heat exchanger; and an axial gas outlet provided on a downstream side of the at least one heat exchanger.

12. The device as claimed in claim 1, wherein the device is arranged horizontally.

13. The device as claimed in claim 1, wherein the helicoid screw is rotatable.

14. The furnace as claimed in claim 8, further comprising
a gas inlet provided tangentially to the axis of the chamber on an upstream side of the at least one heat exchanger, the gas inlet configured to introduce the optimal mixture of the surfactant into the at least one heat exchanger, the surfactant being configured to treat an internal surface of each of the plurality of internal tubes of the at least one heat exchanger; and an axial gas outlet provided on a downstream side of the at least one heat exchanger.

15. The furnace as claimed in claim 8, wherein the at least one heat exchanger is arranged horizontally.

16. The furnace as claimed in claim 8, wherein the helicoid screw is rotatable.

17. The furnace as claimed in claim 8, wherein the device has a shape that is substantially cylindrical, conical, frusto-conical, or resulting from a combination of at least one cylinder and at least one cone or truncated cone.

18. The furnace as claimed in claim 8, wherein the conveyor conveys the surfactant into a gas stream that is rotated by the helicoid screw of each of the plurality of internal tubes, such that a surface treatment of an internal surface of each of the plurality of internal tubes is continuous during operation of the device.

19. The furnace as claimed in claim 8, further comprising the surfactant, wherein the surfactant is selected to abrade a deposit adhering to walls of the plurality of internal tubes.

20. The furnace as claimed in claim 19, wherein the surfactant is selected from components of a glass batch composition that is initially used in the furnace, such that the surfactant collected by the collector is recyclable to the composition.

21. The furnace as claimed in claim 8, wherein a pitch of the helicoid screw is variable.

22. The furnace as claimed in claim 8, wherein the helicoid screw includes two parts respectively made from different materials or from stainless steel and carbon steel.

23. The device as claimed in claim 1, wherein the at least one gas inlet comprises a plurality of gas inlets to respectively supply the plurality of internal tubes with the gas or the combustion gas, and the conveyor includes a plurality of surfactant injection devices to inject the surfactant into the plurality of internal tubes, respectively.

24. The furnace as claimed in claim 8, wherein the at least one gas inlet comprises a plurality of gas inlets to respectively supply the plurality of internal tubes with the gas, and the conveyor includes a plurality of surfactant injection devices to inject the surfactant into the plurality of internal tubes, respectively.

* * * * *